US 6,652,003 B2

(12) United States Patent
Most et al.

(10) Patent No.: US 6,652,003 B2
(45) Date of Patent: Nov. 25, 2003

(54) TRAVEL TRAILER CHASSIS WITH EXTENDED AXLE SUPPORT

(75) Inventors: Randall Lee Most, Hesperia, CA (US); James V. Bertoch, Murrieta, CA (US); Mark Mazurek, Longview, TX (US); Jim D. Baehmann, Highland, CA (US); Kenneth J. Biddle, Lake Elsinore, CA (US)

(73) Assignee: Fleetwood Enterprises, Inc., Riverside, CA (US)

( * ) Notice: Subject to any disclaimer, the term of this patent is extended or adjusted under 35 U.S.C. 154(b) by 91 days.

(21) Appl. No.: 09/974,954

(22) Filed: Oct. 10, 2001

(65) Prior Publication Data

US 2003/0067152 A1 Apr. 10, 2003

(51) Int. Cl.⁷ .............................................. B62D 21/00
(52) U.S. Cl. ........................ 280/783; 280/781; 280/789; 280/790; 296/182

(58) Field of Search ................................ 280/783, 781, 280/789, 790, 796, 797, 798, 799, 800; 296/182, 181

(56) References Cited

U.S. PATENT DOCUMENTS

| 2,853,309 A | * | 9/1958 | Hubbard | |
|---|---|---|---|---|
| 4,534,589 A | * | 8/1985 | Booher | 296/182 |
| 4,714,273 A | * | 12/1987 | Kejr | 280/789 |
| 6,254,132 B1 | * | 7/2001 | Lindsay | 280/789 |

* cited by examiner

Primary Examiner—Eric Culbreth

(57) ABSTRACT

A supplemental chassis platform comprising a box structure is rigidly mounted to travel trailer chassis main rails. The supplemental platform assumes the role of axle support from the chassis rails, where a plurality of cross beams cooperate to form a framework that supports the axle assembly outside of the chassis' twin main rails. With the axles supported by the box section, the chassis rails' spacing can be reduced to increase the storage space available under the shell.

6 Claims, 4 Drawing Sheets

TRAVEL TRAILER CHASSIS WITH EXTENDED AXLE SUPPORT

BACKGROUND OF THE INVENTION

1. Field of the Invention

The present invention relates generally to an improved chassis for a travel trailer vehicle, and in particular to a supplemental support frame for the chassis that supports the axles and allows for increased storage capability.

2. Description of Related Art

The term "travel trailer" as used herein refers to a towed vehicle capable of serving as a living quarters. Travel trailers are constructed in a variety of sizes and shapes, and most typically comprise living quarters of fixed or expandable size for use when the vehicle is not moving. Travel trailers are a popular item for people who like to travel about the country in extended trips because the travelers can store everything needed in the travel trailer without unpacking or transferring the food, equipment, and supplies.

Travel trailers are comprised of the living quarters or "shell" mounted on a vehicle "chassis" designed especially for travel trailers. The motor vehicle industry manufactures a variety of towable chassis that can support different shells depending on the needs and amenities sought. The shell is a self-contained structure comprising walls, a roof, and a floor that is seated and supported on the chassis.

To support the shell and provide rigidity to the chassis, the chassis frame includes two parallel elongate beam members, commonly referred to as chassis rails, that extend between the front and rear ends of the chassis. These chassis rails are normally constructed of steel beams with an I-beam or channel-shaped cross-section. In addition to functioning as the main support structure for the chassis, the chassis rails are used to mount the axles of the chassis. The chassis rails are spaced apart a specific distance to support the axles of the vehicle. The axles that support the wheels are traditionally mounted directly to the two chassis rails, which in turn influences the spacing between the two beams.

A wide spacing between the chassis rails allows for a wider track for the axles. A wide track provides a smoother ride and better handling, with more stability against tipping over—a concern with high profile vehicles such as travel trailers. However, a preference for a wide spacing of the chassis rails is offset by the relationship of the spacing of the rails to the available storage space under the shell. The two rails, since they run predominantly down the longitudinal direction of the chassis, establish a boundary that storage space cannot usually extend beyond. Thus the wider the chassis rails, the less storage capacity is available under the travel trailer to store supplies and equipment. However, narrowing the spacing between the two rails affects the track for the wheels, which is optimally wider than the position established by the normal spacing of the rails.

Since travel trailers are used for long journeys and travel to isolated areas, available storage space is a critical concern. Manufactures have tried to maximize the storage space underneath the shell, but the presence of the chassis rails limits beneath the floor of the shell impacts how much space is available. The manufacturers are therefore left with the decision to narrow the chassis rails at the expense of safety and driving stability, or widen the chassis rails at the expense of limiting the available storage space for the travel trailer.

SUMMARY OF THE INVENTION

It is apparent from the foregoing that there is a need for a new and improved travel trailer and, more specifically, for a travel trailer which overcomes the problems associated with a lack of easily-accessible space for personal goods in a travel trailer. To overcome the shortcomings of the existing art, the present invention provides a supplemental chassis platform comprising a box structure that is rigidly mounted to the main chassis rails. The supplemental platform assumes the role of axle support from the chassis rails, where a plurality of cross beams cooperate to form a framework that supports the axle assembly outside of the chassis' twin main rails. With the axles supported by the box section, the chassis rails' spacing can be reduced to increase the storage space available under the shell.

In a preferred embodiment, the box section uses three elongate steel tubes to form cross or traverse members for lateral support. The traverse members pass directly through the main rails at pre-cut holes and are welded at the junction between the traverse members and the chassis rails. By welding the cross members around the juncture's circumference, a strong attachment to both rails is achieved for each cross member. Further, by passing the cross members through the main chassis rails the axles supported on the box platform are kept in the same plane as the bottom of the rails, allowing an increase in storage above the rails while keeping the height of the trailer as it would have been without the added structure. Each traverse cross member is attached at respective ends to first and second side beams to form a rigid box support or platform upon which an axle assembly can be mounted. The side beams are positioned outside of the main chassis rails to extend the axle support beyond the main chassis rails and provide wide track attachment points for the axles. Further, each cross member attaches to the side beams at locations corresponding to axle support attachment points. The loads from the axles through the axle support are thus translated into the main beam through the cross members.

The particular travel trailer chassis illustrated in the drawings utilizes the concepts of this invention as are defined in the appended claims. Those skilled in the field of the construction and design of travel trailer chassis will realize that these operative concepts may be easily employed in travel trailer chassis which differ significantly in appearance or construction from the chassis illustrated through the use and exercise of routine engineering skill in the noted field. Further, other objects and merits and a fuller understanding of the present invention will be obtained by those having ordinary skill in the art when the following detailed description of the preferred embodiment is read in conjunction with the accompanying drawings. Therefore, the accompanying drawings are not to be considered as limiting this invention.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved chassis for a travel trailer vehicle.

Figure 1:
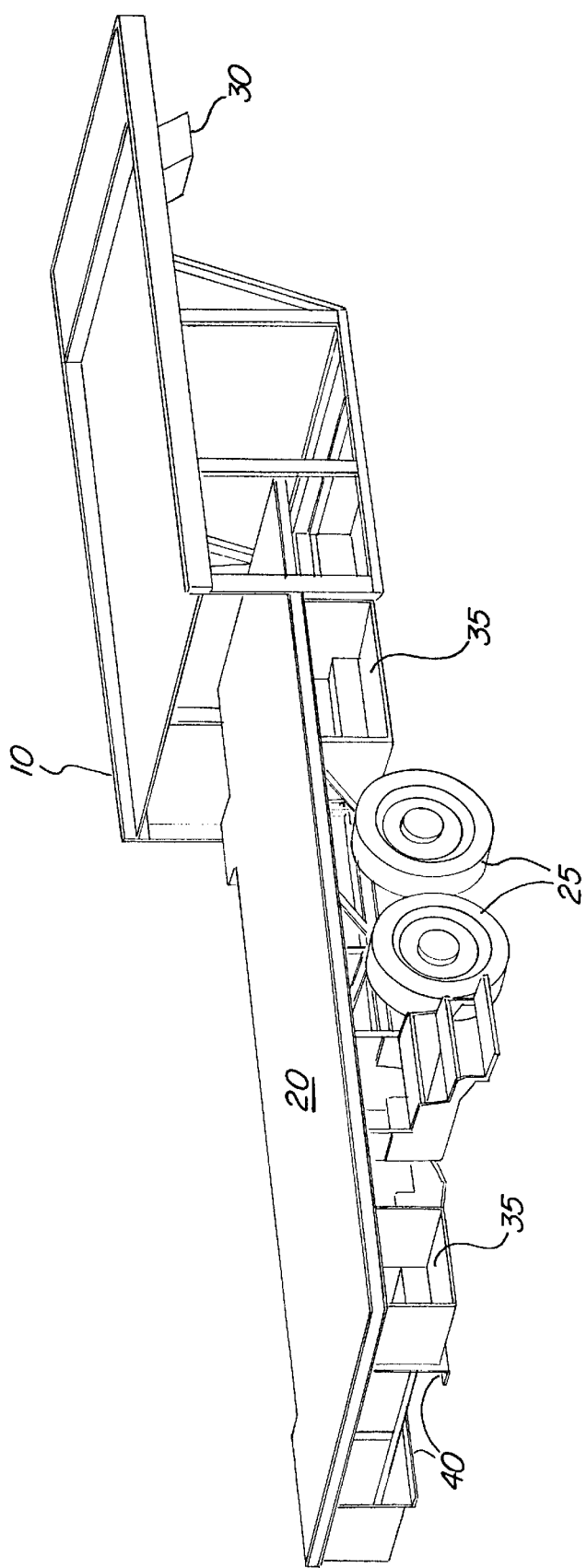
FIG. 1 is an elevated perspective view of the presently preferred embodiment of a travel trailer chassis in accordance with this invention.

FIG. 1 is an elevated perspective view of a travel trailer chassis 10 without the shell, but with a floor panel 20 over the framework of the chassis 10. A pair of axles (not shown) mounted to wheels 25 are centered under the lower half of the platform 20 to distribute the weight of the travel trailer, and a hitch 30 is typically located at the front of the chassis that permits the travel trailer to be towed by a truck or other means. FIG. 1 also illustrates several storage compartments 35 found beneath the floor panel 20. The storage compartments 35 are found on both sides of the vehicle and the size of the storage compartments are of great concern to consumers who purchase travel trailers. It is preferable to increase the storage capacity of the compartments 35 to their greatest extent to make the travel trailers more desirable to customers. FIG. 1 also illustrates the two main chassis rails 40, as seen from the rear of the chassis 10. The storage compartments 35 extend generally to the chassis rails 40, establishing the maximum depth of the storage compartments 35.

Figure 2:
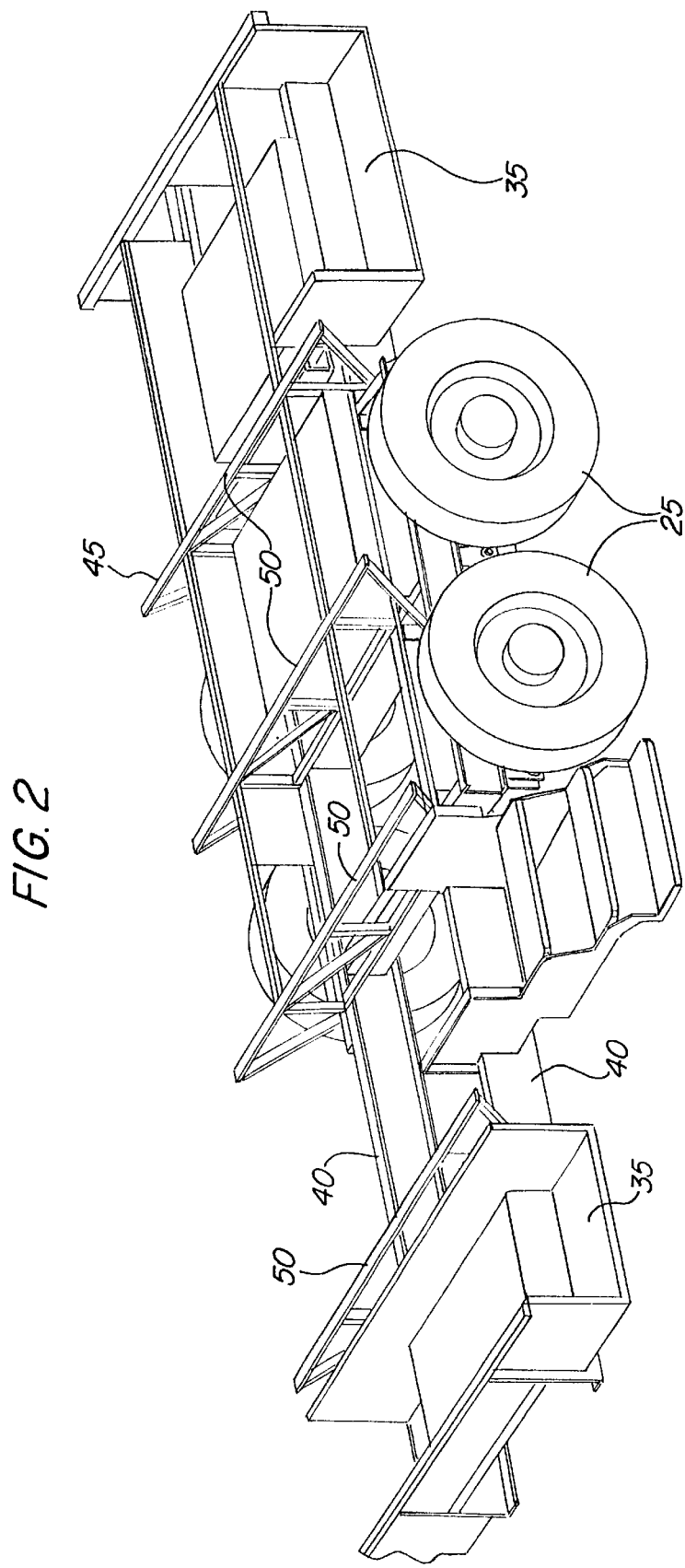
FIG. 2 is an elevated perspective view of the presently preferred embodiment of a travel trailer chassis with the floor panel removed, in accordance with this invention.

FIG. 2 is an elevated perspective view of the axle region of the present invention with the floor panel removed, revealing a truss support framework 45 that supports the floor panel. The truss support framework 45 comprises a series of individual trusses 50 mounted directly to the main chassis rails 40, and extend the height of the floor above the main chassis rails 40, providing a passageway for the storage compartments 35 over the main rails 40. Thus, as can be seen in FIG. 2, the storage compartments extend across the vehicle for a space created by the truss framework 45, thereby expanding the storage capacity and allowing longer items to be stored in the storage compartments 35, such as tent poles, fishing poles, etc. The pair of main chassis rails 40 have the shape of I-beams or C-beams, and run substantially the length of the chassis to provide the backbone for the chassis. The main rails 40 give the chassis 10 support and rigidity, and provide a base on which other components of the chassis are configured about. Since the storage compartments 35 cannot extend outward beyond the wall of the shell lest they protrude from the vehicle, the depth of the storage compartments 35 are fixed (below the truss support framework 45) by the location of the chassis main rails 40.

Figure 3:
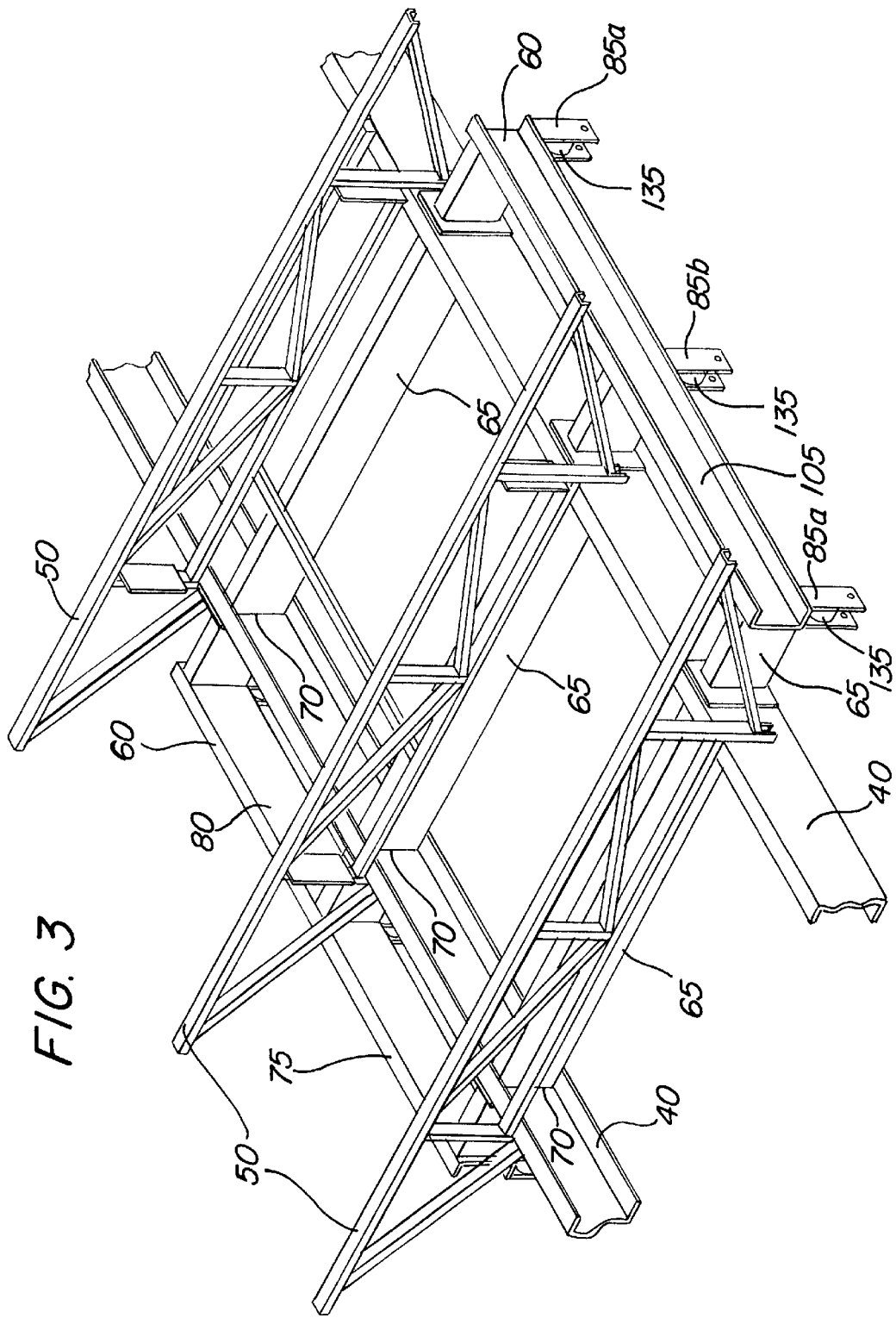
FIG. 3 is an elevated perspective view of the chassis frame with supplemental box platform and truss supports.

In FIG. 3, a supplemental chassis frame assembly is shown as a box support platform 75 at the axles of the chassis. The box support platform 75 comprises three traverse members 65 which pass through the main chassis rails 40 at pre-cut holes, where they are fixed in place at the circumference of the traverse members by welding the joints 70. Adjacent and outboard of the main chassis rails 40 are secondary rails or side beams 60 extending parallel to the main rails 40. The traverse members 65 are welded to the side beams 60 at an inner face 80 to form a rigid box support 75. The traverse members 65 can be a seven gage steel tube of rectangular cross-section, such as six inches by two inches. The side beams 60 are preferably six inch "C" channel beams or tube steel, and at the bottom of the side beams 60 are a plurality of axle support brackets 85 aligned with the traverse members 65.

Figure 4:
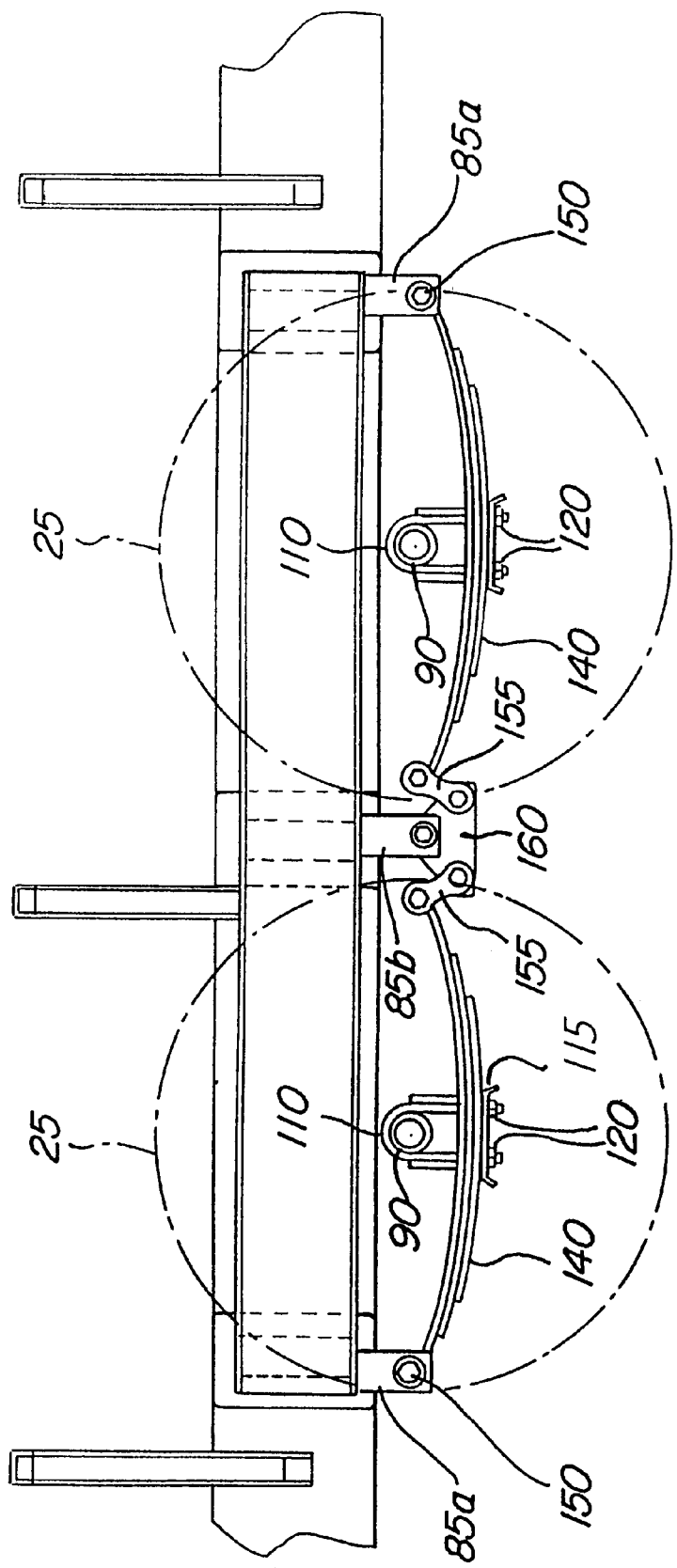
FIG. 4 is a side view of the supplemental box platform illustrating the axle supports.

As shown in FIGS. 3 and 4, the location of the traverse members 65 each coincide with an axle attachment point, i.e. the axle support brackets 85a–85c on the side beams 60. Thus, the loads from the axles 90 are translated via the traverse members 65 directly to the main chassis rails 40, which are already designed to withstand the stresses of the axle loading. Further, by pressing the traverse members 65 directly through the main chassis rails 40 (as opposed to mounting the traverse members above or below the main chassis rails), the elevation of the supplemental box support coincides with the position of the original axle support assembly without the box support platform, preserving the original height of the travel trailer in view of the box support.

The axles 90 of the travel trailer are supported by a U-bolt 110 that locks the axle to a base 115 via fasteners 120. The base 115 and U-bolt 110 are mounted to the axle support brackets 85a,b by a linkage system comprising leaf springs 140 mounted to the outer axle support brackets 85a via pins 150, and mounted to the inner axle support bracket 85b using a pair of arms 155 mounted to a triangular base 160, which in turn is mounted via pin to the inner axle support bracket 85b.

As just described, the side beams 60 support the axles 90 for the wheels 25 of the travel trailer. Whereas the prior art used the main chassis rails 40 to mount the axles, the present invention extends the axle support wider than the main chassis rails 40 using the box support to achieve this objective. This serves two purposes: first, the wider track achieved as a consequence of supporting the axles at a greater distance provides greater stability and handling of the travel trailer; and second, the supporting of the axles by the box support allows the main chassis rails to be moved closer together since the need to provide a wide track for the axles is no longer necessary. A consequence of moving the main chassis rails closer together is the creating of additional storage space in the storage compartments which abut the main chassis rails. For example, the storage space just ahead of the rear wheel axles in FIG. 2 is enlarged by moving the abutting main chassis rail inward, but the track is not reduced due to the box support.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An axle support for a recreational vehicle chassis to be mounted on a pair of chassis main rails extending longitudinally along the chassis comprising:
   a frame comprising:
      first and second support members aligned parallel to each other and parallel to chassis main rails, where said first pair of support members are located outside of the pair of main rails;
      a plurality of traverse members rigidly disposed between and connected perpendicularly to the first and second support members, where the plurality of traverse members each pass through respective holes in the main chassis rails; and an axle mounting assembly disposed on each of the first and second support members for mounting the axle to said frame.

2. The axle support of claim 1 wherein the plurality of traverse members are each mounted to the first and second support members at a position coinciding with an axle support connection point.

3. The axle support of claim 1 wherein the plurality of traverse members comprise a steel tubing having a rectangular cross-section, where the juncture between the main rails and the traverse members are secured by welding around the perimeter of the traverse members.

4. An improved chassis for a travel trailer, said chassis having a pair of longitudinal main chassis rails extending generally the length of said chassis, the improvement comprising:

an axle support mounted on the chassis at the main rails, the axle support comprising at least three traverse members rigidly secured between two supplemental rails, said supplemental rails and said traverse members cooperating to form a box structure, said traverse members each passing respectively through a hole in the main chassis rails;

axle mounting brackets located at the supplemental rails, where each axle mounting bracket is located at a position colinear with an axis of a respective traverse member.

5. The improved chassis of claim 4 further comprising a plurality of truss supports mounted on the longitudinal main chassis rails at spaced intervals, said truss supports adapted to support a shell structure above the chassis main rails.

6. The improved chassis of claim 4 wherein each traverse member passes through the main rails at a respective hole, and where the juncture between the traverse member and the main rails at said holes are welded about a perimeter thereof.

* * * * *